United States Patent
Goodson et al.

(10) Patent No.: US 10,070,450 B2
(45) Date of Patent: Sep. 4, 2018

(54) PROVIDING AIRTIME FAIRNESS IN WIRELESS SYSTEMS

(71) Applicant: ADTRAN, INC., Huntsville, AL (US)

(72) Inventors: Richard Lee Goodson, Huntsville, AL (US); Ramya Raghavendra, Huntsville, AL (US)

(73) Assignee: ADTRAN, Inc., Huntsville, AL (US)

(*) Notice: Subject to any disclaimer, the term of this patent is extended or adjusted under 35 U.S.C. 154(b) by 211 days.

(21) Appl. No.: 14/585,632

(22) Filed: Dec. 30, 2014

(65) Prior Publication Data
US 2016/0192378 A1 Jun. 30, 2016

(51) Int. Cl.
*H04W 72/10* (2009.01)
*H04L 12/801* (2013.01)
*H04L 12/863* (2013.01)
*H04W 24/10* (2009.01)
*H04L 12/26* (2006.01)
*H04W 72/12* (2009.01)

(52) U.S. Cl.
CPC ....... *H04W 72/10* (2013.01); *H04W 72/1263* (2013.01); *H04L 47/14* (2013.01); *H04L 47/50* (2013.01)

(58) Field of Classification Search
CPC ....... H04L 47/39; H04L 47/22; H04L 47/215; H04L 47/527; H04L 47/623; H04L 43/0894; H04L 47/14; H04L 47/50; H04L 1/0002; H04L 5/0064; H04L 47/225; H04W 72/10; H04W 72/1263; H04W 52/26
See application file for complete search history.

(56) References Cited

U.S. PATENT DOCUMENTS

| | | | | |
|---|---|---|---|---|
| 5,835,711 A | * | 11/1998 | Chang | H04L 12/5602 370/450 |
| 6,393,012 B1 | * | 5/2002 | Pankaj | H04L 12/5693 370/342 |
| 2002/0101919 A1 | * | 8/2002 | Takada | H04L 25/0262 375/225 |
| 2003/0185155 A1 | * | 10/2003 | Huang | H04L 12/5693 370/235 |

(Continued)

OTHER PUBLICATIONS

Own the Air: Testing Aruba Networks; Adaptive Radio Management (ARM) in a High Density Client Environment, Network Test Inc., Jul. 2010, 25 pages.

(Continued)

*Primary Examiner* — Hoang-Chuong Q Vu
(74) *Attorney, Agent, or Firm* — Fish & Richardson P.C.

(57) ABSTRACT

Methods, systems, and apparatus for providing airtime fairness in a telecommunications network are disclosed. In one aspect a method includes determining, by an access point, respective transmission rates of multiple stations configured to wirelessly communicate with the access point; determining, by the access point and for each of the multiple stations, a weight of the station that is proportional to the respective transmission rate of the station; and transmitting, wirelessly by the access point and to each of the multiple stations, one or more packets to the station during an airtime allocation to the station, wherein the amount of one or more packets transmitted during the airtime allocation corresponds to the weight of the station and a size of queued packets for the station.

21 Claims, 4 Drawing Sheets

(56) References Cited

U.S. PATENT DOCUMENTS

| | | | |
|---|---|---|---|
| 2003/0198204 A1* | 10/2003 | Taneja | H04L 5/023 370/332 |
| 2004/0196860 A1* | 10/2004 | Gao | H04L 1/1812 370/437 |
| 2005/0180444 A1* | 8/2005 | Gu | H04L 12/5693 370/412 |
| 2007/0115817 A1* | 5/2007 | Gupta | H04L 12/66 370/230 |
| 2007/0286149 A1* | 12/2007 | Yamamoto | H04W 72/1263 370/345 |
| 2008/0192724 A1* | 8/2008 | Kondo | H04L 47/10 370/345 |
| 2010/0135236 A1* | 6/2010 | Wang | H04W 72/1257 370/329 |
| 2011/0044170 A1* | 2/2011 | Kure | H04L 12/5693 370/235 |
| 2011/0075562 A1* | 3/2011 | Isaksson | H04L 47/14 370/235.1 |
| 2011/0149881 A1* | 6/2011 | Gong | H04B 7/0452 370/329 |
| 2012/0002618 A1* | 1/2012 | Nakagawa | H04W 72/1247 370/329 |
| 2012/0149425 A1* | 6/2012 | Choi | H04W 52/40 455/522 |
| 2013/0003538 A1* | 1/2013 | Greenberg | H04L 47/12 370/230 |
| 2013/0107817 A1* | 5/2013 | Yuan | H04W 72/1289 370/329 |
| 2013/0114520 A1* | 5/2013 | Cheng | H04W 28/0205 370/329 |
| 2014/0293904 A1* | 10/2014 | Dai | H04B 7/024 370/329 |
| 2015/0124602 A1* | 5/2015 | Oishi | H04L 47/621 370/230 |
| 2015/0131537 A1* | 5/2015 | Chiang | H04L 5/0057 370/329 |
| 2015/0264707 A1* | 9/2015 | Golderer | H04W 72/087 370/329 |
| 2016/0112902 A1* | 4/2016 | Huh | H04W 28/0289 370/235 |
| 2017/0164282 A1* | 6/2017 | Zhang | H04L 5/0032 |
| 2017/0171053 A1* | 6/2017 | Giroux | H04L 43/16 |

OTHER PUBLICATIONS

Chun-Ting Chou, "Contention-Based Airtime Usage Control in Multirate IEEE802.11 Wireless LANS", IEEE/ACM Transactions on Networking, vol. 14, No. 6, Dec. 2006, 14 pages.

R.G. Garroppo et al., "Providing Air-time Usage Fairness in IEEE 802.11 Networks with the Deficit Transmission Time (DTT) Scheduler", University of Pisa, Dept. of Information Engineering; 26 pages.

Martin Heusse et al., "Idle Sense: An Optimal Access method for High Throughput and Fairness in Rate Diverse Wireless LANS", LSR-IMAG Laboratory, Grenoble, France, 12 pages.

Hyogon Kim et al., "Resolving 802.11 Performance Anomalies through QoS Differentiation", IEEE Communications Letters, vol. 9, No. 7, Jul. 2005, 3 pages.

M. Shreedhar, George Varghese, "Efficient Fair Queuing Using Deficit Round Robin", IEEE/ACM Transactions on Networking, vol. 4, No. 3, Jun. 1996, 11 pages.

Godrey Tan and John Guttag, "Time-based Fairness Improves Performance in Multi-rate WLANS", MIT Computer Science and Artificial Intelligence Laboratory, 14 pages.

Tarun Joshi et al., "Airtime Fairness for IEEE 802.11 Multirate Networks", IEEE Transactions on Mobile Computing, vol. 7, No. 4, Apr. 2008, 15 pages.

Ilenia Tinnirello et al., "Performance Evaluation of Differentiated Access Mechanisms Effectiveness in 802.11 Networks", IEEE Communications Society, Globecomm 2004, 5 pages.

Vasilios A. Sirs, George Stamatakis; "Optimal CWmin Selection for Achieving Proportional Fairness in Multi-Rate 802.11e WLANs: Test-bed Implementation and Evaluation", WinTech 2006, Sep. 29, 2006, 8 pages.

Yassine Chetoui and Nizar Bouabdallah, Adjustment mechanism for the IEEE 802.11 contention window: An Efficient bandwidth sharing scheme; www.sciencedirect.com, 2007 Elsevier B.V., 10 pages.

* cited by examiner

PROVIDING AIRTIME FAIRNESS IN WIRELESS SYSTEMS

BACKGROUND

This specification relates to communications in a telecommunications environment.

In a typical wireless network, each station contends for the wireless channel in order to transmit data. The channel is allocated to a station that wins the contention battle. The station then transmits a unit of data, which can be one packet, over the duration that it holds the channel and releases the channel once the transmission finishes. The process of contention then repeats again.

SUMMARY

In general, one innovative aspect of the subject matter described in this specification can be embodied in methods that include determining, by an access point, respective transmission rates of multiple stations configured to wirelessly communicate with the access point; determining, by the access point and for each of the multiple stations, a weight of the station that is proportional to the respective transmission rate of the station; and transmitting, wirelessly by the access point and to each of the multiple stations, one or more packets to the station during an airtime allocation to the station, wherein the amount of one or more packets transmitted during the airtime allocation corresponds to the weight of the station and a size of queued packets for the station.

Another innovative aspect of the subject matter described in this specification can be embodied in a device that includes a memory storing instructions executable by one or more data processing devices; one or more data processing devices that interact with the memory and execute instructions that cause the device to be configured to determine respective transmission rates of multiple stations configured to wirelessly communicate with the device; determine, for each of the multiple stations, a weight of the station that is proportional to the respective transmission rate of the station; and transmit, wirelessly to each of the multiple stations, one or more packets to the station during an airtime allocation to the station, wherein the amount of one or more packets transmitted during the airtime allocation corresponds to the weight of the station and a size of queued packets for the station.

Another innovative aspect of the subject matter described in this specification can be embodied in a system that includes an access point; and multiple stations configured to wirelessly communicate with the access point; and the access point including one or more data processing devices, the access point configured to determine respective transmission rates of multiple stations configured to wirelessly communicate with the device; determine, for each of the multiple stations, a weight of the station that is proportional to the respective transmission rate of the station; allocate, to each of the multiple stations, a portion of airtime for downstream transmission to each of the stations based on the weights of the multiple stations; and transmit, wirelessly to each of the multiple stations, one or more packets to the station during an airtime allocation to the station, wherein the amount of one or more packets transmitted during the airtime allocation corresponds to the weight of the station and a size of queued packets for the station.

These and other embodiments can each optionally include one or more of the following features. Methods can include the action of updating, for the station, a deficit counter by adding the weight of the station to the deficit counter of the station; and wherein transmitting one or more packets to the station can includes transmitting, to the station, one or more packets until the deficit counter is less than a size of a next packet to be transmitted to the station.

Methods can include the action of deducting the size of each transmitted packet from the deficit counter.

Methods can include the action of updating a deficit counter by adding a weight of the station to the deficit counter of the station; and wherein transmitting one or more packets to the station can includes determining, during a given transmission interval, that the deficit counter for a given station is less than a size of a next packet to be transmitted to the station; preventing transmission of a packet to the station in response to determining that the deficit counter is less than the size of the next packet; and transmitting a packet to a different station.

Methods can include the action of determining, by the access point, one of the multiple stations having an updated transmission rate; updating, by the access point, a weight of the station that is proportional to the updated transmission rate; and transmitting, wirelessly by the access point, one or more packets to the station during an airtime allocation to the station, wherein the amount of one or more packets transmitted during the airtime allocation corresponds to the updated weight of the station and the size of queued packets for the station.

Methods can include the action of enabling block transmission by setting a weight of a station having a maximum transmission rate to a size of a maximum transmission block.

Methods can include the action of determining a change of a maximum transmission rate among the transmission rates of the multiple stations; and recalculating the weights of the multiple stations based on the change.

Particular embodiments of the subject matter described in this specification can be implemented so as to realize one or more of the following advantages. The disclosed subject matter can improve wireless technologies by providing airtime fairness for multiple stations sharing and contending the same wireless spectrum (e.g., in a WiFi network), for example, in the downstream direction from an access point to multiple users. The disclosed subject matter can improve wireless technologies by reducing the possibility that stations with lower transmission rates will slow down the entire network. Thus, the disclosed subject matter can improve overall throughput of the network, thereby improving wireless technologies. The disclosed subject matter can enable each wireless station to achieve data throughput that is proportional to the transmission rate of the wireless station. The weights can also be adjusted to give higher proportional throughput to some stations compared to others.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Example techniques are disclosed in this document to provide airtime fairness to multiple stations that share a wireless channel. For instance, the example techniques can provide substantially equal airtime (e.g., statistically over time) to multiple stations that are communicably coupled to an access point (AP) and share a wireless local area network (WLAN, also referred to as WiFi) channel. In some implementations, the example techniques can be based on a deficit round robin (DRR) allocation and allow each station to achieve throughput proportional to its transmission rate by ensuring that each station gets equal airtime (e.g., based on a long time average). The transmission rate can be the current communication bit rate from the AP to the station if there were no contention with other stations. In some instances, the transmission rate is also referred to as data rate or connect rate. Throughout this disclosure, the example allocation technique is referred to as a DRR airtime fairness (DRRAF) allocation, or simply DRRAF.

In some instances, the example DRRAF allocation can provide fairness to the multiple stations in the network by providing equal airtime, rather than allocate the wireless channel to a user for the duration required to transmit one unit of data, so as to avoid lower data rate stations hogging resources for more time than higher data rate stations and limiting the overall throughput of the network. In some instances, the example techniques can be a packet scheduling scheme, which can eliminate the need to keep track of how much time each station occupies on the air.

The example techniques described herein can be implemented in methods, computer program products, apparatus, devices, etc., for example, to provide airtime fairness among a number of stations or devices of a telecommunications network, thereby improving quality of service and throughput of the telecommunications network.

The example techniques can be implemented at a network element in a telecommunications network. For example, the example techniques can be implemented in an Access Point (AP) of a WLAN system in a centralized manner, in a network element of an ad hoc network in a distributed manner, or in another network element of another type of network.

Throughout this document, the terms "downlink," "downstream" (DS), and "downstream communications" are used to refer to communications transmitted toward the end user (e.g., from an AP to a user station), while the terms "uplink," "upstream" (US), and "upstream communications" are used to refer to communications transmitted toward the service provider (e.g., from a station to an AP).

Figure 1:
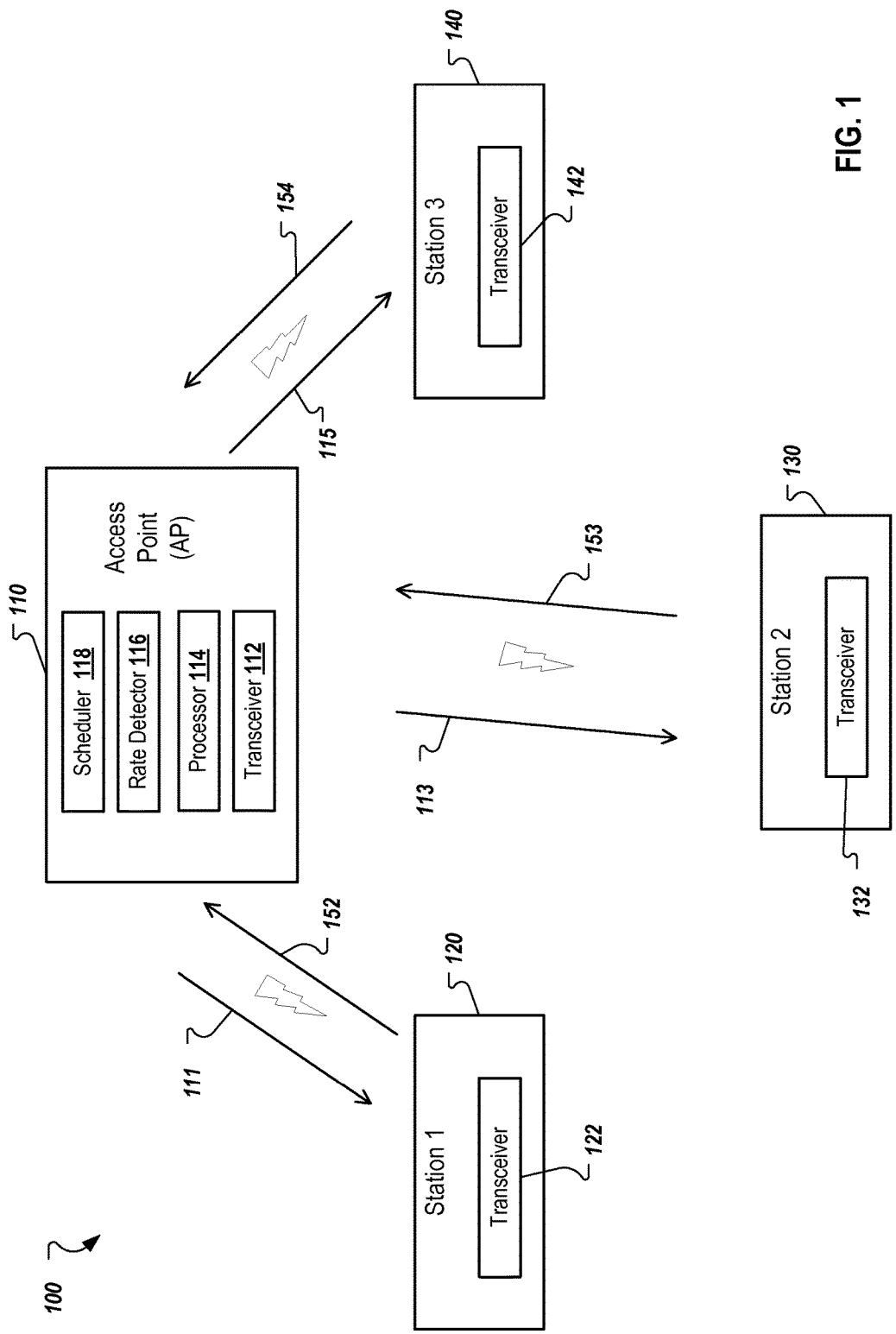
FIG. 1 is a block diagram of an example environment in which deficit round robin (DRR) airtime fairness (DRRAF) allocation can be implemented.

The discussion that follows with reference to FIG. 1 introduces components of an example telecommunications network in which the DRRAF allocation can be implemented. The description referencing FIGS. 2 and 3 relates to example airtime allocation among two stations when a DRRAF allocation is implemented at a network element (e.g., the AP of FIG. 1) to provide airtime fairness among the two stations. The description referencing FIG. 4 provides details regarding an example implementation of the DRRAF allocation.

FIG. 1 is a block diagram of an example environment 100 in which DRRAF can be implemented. The environment 100 can be a wireless local area network (WLAN) or WiFi network using, for example, 802.11a/b/g/n and/or other WLAN protocols. The WLAN of the environment 100 can connect to a network (not shown), such as a cellular network, a wireline network (e.g., a digital subscriber line (DSL) system using xDSL (e.g., ADSL2+, VDSL2, etc.) technologies, an optical fiber network, etc.), an ad hoc network, and/or other suitable networks operating independently and/or in conjunction with other networks.

The environment 100 includes an access point (AP) 110 and a number of stations 120, 130, and 140. In some implementations, the environment 100 can include additional or different components and features and can be configured in a different manner than the example environment 100 as shown in FIG. 1.

The AP 110 is a device that allows wireless devices (e.g., the stations 120, 130, and 140) to connect to a wired network using WLAN or other communications technologies. The AP 110 can be coupled to a wired network (e.g., an optical network, an XDSL network, Internet, etc.). For example, the AP 110 can connect to a router (e.g., via a wired network) as a standalone device or it can be an integral component of the router.

The AP 110 can include, among other components, a transceiver 112, a processor 114, a rate detector 116, and a scheduler 118. The transceiver 112 is capable of transmitting and receiving signals to and from other network elements in the environment 100. For example, the transceiver 112 can communicate with the multiple stations 120, 130, and 140 using radio frequency spectrum based on WLAN or other wireless communications technologies. The AP 110 can also communicate with routers and gateways through optical fiber, twisted pair conductors, or other media based on wireline communications technologies.

The processor 114 is configured to and capable of executing instructions related to one or more of the processes or methods described herein. For example, the processor 116 can interact with the rate detector 116 for performing the DRRAF allocation as discussed in more detail below with reference to FIG. 4, and cause the scheduler 118 to schedule the transmissions of the multiple stations 120, 130, and 140.

The rate detector 116 is configured to and capable of determining a downstream transmission rate from the AP 110 to another station. The rate detector 116 can determine the transmission rate, for example, based on channel estimation, control information received from a station (e.g., a channel quality indicator, a transmission rate identifier, etc.), retransmission schemes, etc. The rate detector 116 can provide the determined transmission rates to the processor 114 and/or scheduler 118 for scheduling purposes.

The scheduler 118 schedules packet transmission and grants access to the stations, for example, according to the order of transmissions determined based on the DRRAF allocation.

In some implementations, the rate detector 116 and/or the scheduler 118 can be integral parts of the processor 114 or they can be implemented as separated modules.

The stations 120, 130, and 140 can include any wireless and similar devices that have telecommunications capabilities. In some instances, a station may refer to a mobile, wireless device or a generally non-transportable device, such as desktop computers or set-top boxes with wireless network communication capabilities. Examples of the stations include, but are not limited to, a mobile phone, a smart phone, a computer (including desktop, laptop, tablet, etc.), a telephone, a television, a cable set-top box, a personal digital assistant (PDA), or other communications devices.

Each of the stations 120, 130, and 140 is capable of communicating with the AP 110 wirelessly. Specifically, the stations 110, 120, and 130 include transceivers 122, 132, and 142 that are each communicably linked to the AP transceiver 112. The AP 110 can transmit downstream traffic 111, 113, and 115 to the stations 120, 130, and 140, respectively. The AP 110 can also receive upstream traffic 152, 153, and 154 from the stations 120, 130, and 140, respectively. The stations 110, 120, and 130 share the same wireless channel and can contend for the wireless channel for their downstream and upstream communications with the AP 110.

When a station wins the contention test, the station can hold the wireless channel to transmit an amount of data traffic (e.g., in terms of packets). In some instances, the amount of data transmitted while the station holds the channel depends on its transmission rate. For example, using the DRRAF as discussed in more detail below, the AP will transmit more data to a station having a higher transmission rate than the amount of data transmitted to another station having a lower transmission rate. In some implementations, the amount of data transmitted to each of the stations will be proportional to the transmission rate of the station.

The transmission rate of the station can depend on the type of WLAN protocol that the station follows (e.g., 802.11b, 802.11n, 802.11ac, etc.) and which of the multiple rates specified within each protocol that the station chooses. The transmission rate can also depend on the conditions of the wireless channel between the source and the destination. The conditions of the wireless channel can vary over time, thus leading to changes of the transmission rate of the station.

For downstream transmissions, typically the AP 110 decides the order of transmission among the multiple stations. In some instances, the multiple stations that share the wireless channel can have different transmission rates. When one station's transmission rate is significantly slower than the others and the AP 110 transmits each station a same amount of data (e.g., 1 unit of data) each time the station is allocated airtime, stations having a higher transmission rate will spend most of the time waiting for the transmissions to the slower station to be completed. For example, say station 1 has a very low bit rate compared to station 2, and therefore a packet for station 1 takes much longer to transmit than a comparable packet for station 2. In this example, station 2 spends most of its time waiting for transmissions to station 1 to complete. As a result, the packet rate of station 2 is equal to the packet rate of station 1, even though the transmission rate of station 2 is much higher than station 1. Thus, the low transmission rate of station 1 limits the overall throughput of the network.

To improve network throughput and utilization of the wireless channel, the AP 110 can perform the DRRAF to provide airtime fairness in scheduling the transmissions of the multiple stations. In some instances, with airtime fairness, each station can be transmitted an amount of data proportional to its transmission rate, which will result in each station being given substantially equal time on the wireless channel. As used throughout this document, the term allocated airtime (or airtime allocation) refers to an opportunity for transmissions from/to a given station, but does not imply that the given station is allocated any specific amount of airtime. Rather, the amount of airtime allocated to each station will depend on the amount of data that is transmitted to that station according, for example, to the DRRAF. For instance, an airtime allocation per station according to DRRAF can be the time that packets are sent consecutively to a single station.

Figure 2:
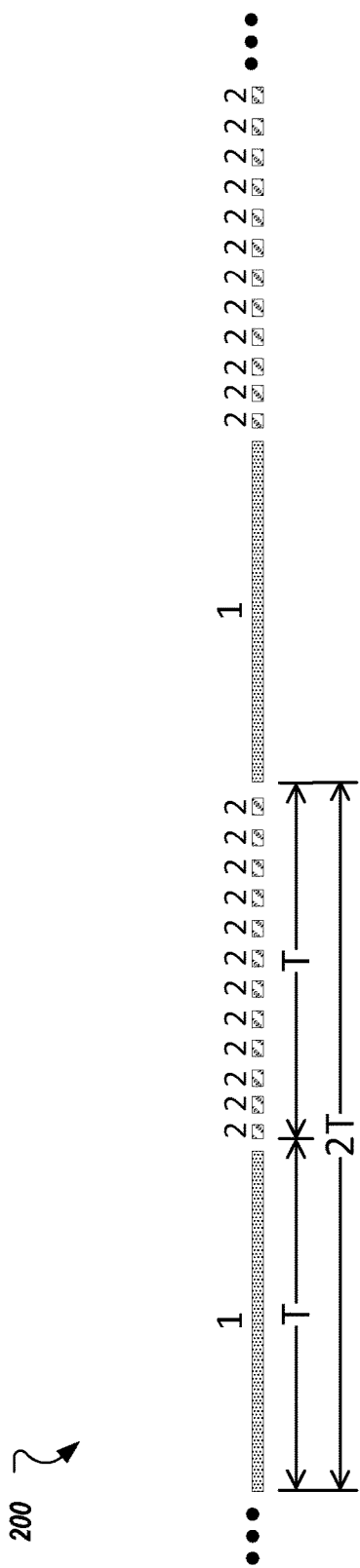
FIG. 2 is a block diagram showing an example airtime allocation between two stations when an example DRRAF allocation is implemented in a telecommunications network.

FIG. 2 is a block diagram 200 showing an example airtime allocation result between two stations when an example DRRAF allocation is implemented in a telecommunications network. As shown in FIG. 2, a station with a higher transmission rate (e.g., station 2) can transmit or receive more frames/packets than the station with a lower transmission rate (e.g., station 1) in a same amount of time T. If every station is getting substantially equal airtime, then the throughput of the stations will be proportional to their data rates.

A numeric example is given in Table I. In this example, the transmission rates of the stations 1 and 2 are 1 Mpbs and 100 Mpbs, respectively. Without airtime fairness (e.g., transmitting a single unit of data to each station each time they are allocated airtime), the throughput of the two stations are both 1 Mpbs, whereas, with airtime fairness (e.g., transmitting, to each station, an amount of data proportional to the transmission rate of the station each time the station is allocated airtime), the throughput of the two stations are 0.5 Mpbs and 50 Mbps, respectively. The overall throughput of the two stations increases from 2 Mbps to 50.5 Mbps, when the airtime fairness is implemented.

TABLE I

Example of Airtime Fairness (ATF)

|  | Station 1 | Station 2 |
| --- | --- | --- |
| Transmission Rate | 1 Mbps | 100 Mbps |
| Throughput-without ATF | 1 Mbps | 1 Mbps |
| Throughput-with ATF | 0.5 Mbps | 50 Mbps |

In some implementations, airtime fairness is achieved by transmitting a specified amount of data to each station (e.g., an amount proportional to its transmission rate) each time the station is allocated airtime. Continuing with the example above, airtime fairness can be achieved by transmitting station 2 a hundred times the amount of data transmitted to station 1 each time the stations are respectively allocated the channel. Achieving airtime fairness is discussed in more detail below.

Figure 3:
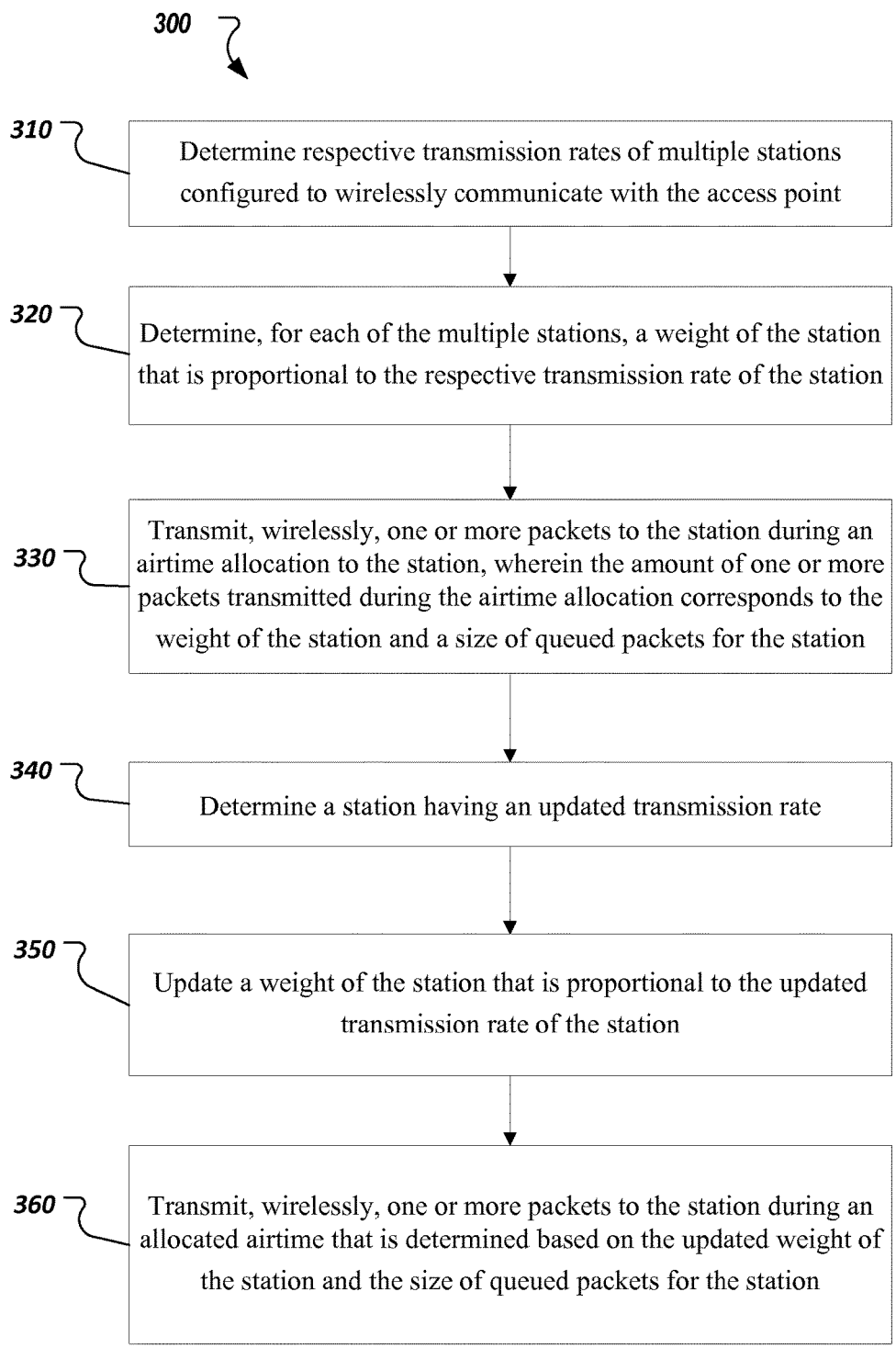
FIG. 3 is a block diagram showing another example airtime allocation between two stations when an example DRRAF allocation is implemented in a telecommunications network.
Figure 4:
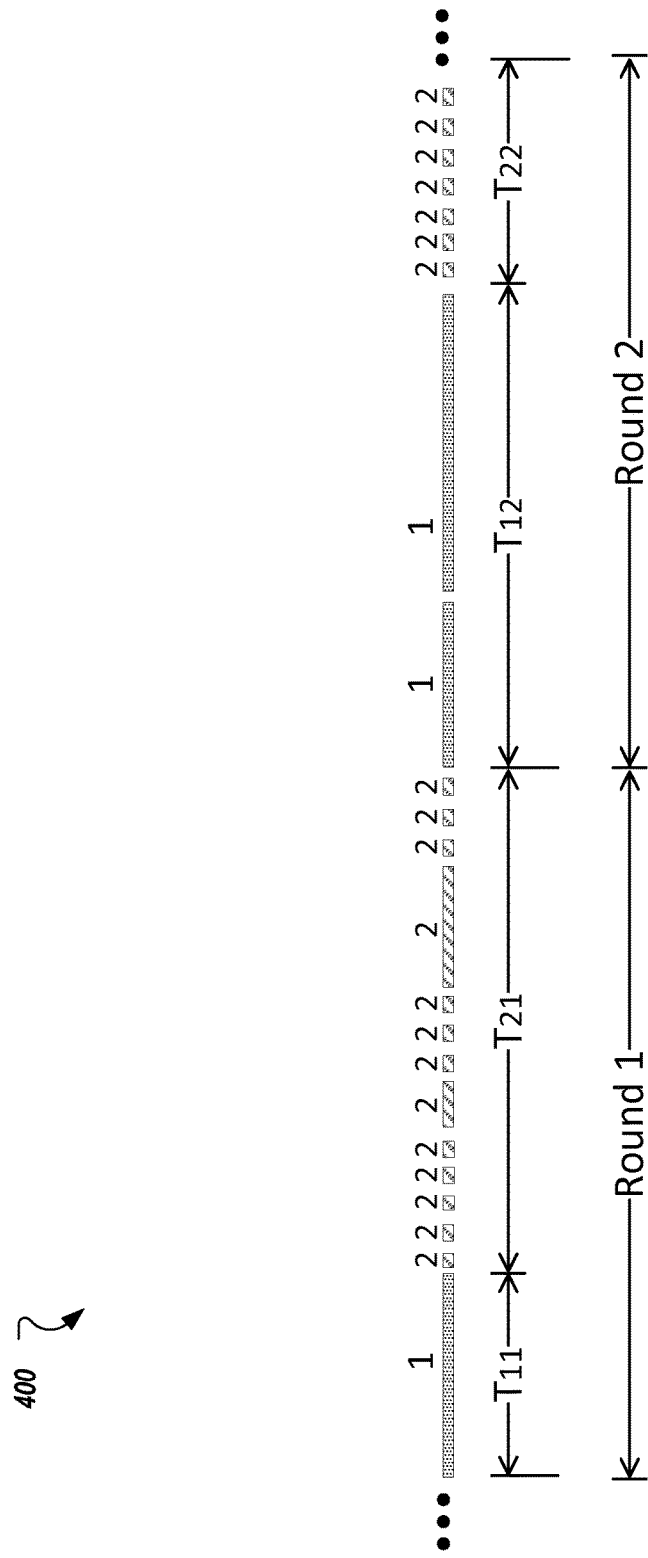
FIG. 4 is a flow chart of an example process of a DRRAF allocation for providing airtime fairness among multiple stations in a telecommunications network.

FIG. 3 is a flow chart of an example process 300 of a DRR airtime fairness (DRRAF) allocation for providing airtime fairness among multiple stations in a telecommunications network. The process 300 can be implemented, for example, as computer instructions stored on computer-readable media and executable by data processing apparatus, such as one or more processors of a network element within a telecommunications network discussed above with respect to FIG. 1. For example, the process 300 can be implemented by the AP 110 of FIG. 1.

The example process 300, individual operations of the process 300, or groups of operations may be iterated or performed simultaneously (e.g., using multiple threads). In some cases, the example process 300 may include the same, additional, fewer, or different operations performed in the same or a different order.

Respective transmission rates of multiple stations that are configured to wirelessly communicate with an AP are determined (310). For example, the multiple stations can be the example stations 120, 130, and 140 that are configured to wirelessly communicate with the AP 110 of FIG. 1. The transmission rates of the multiple stations can be determined, for example, by the rate detector 116 of the AP 110 as described with reference to FIG. 1. The transmission rates can include currently supported or selected downstream transmission rates from the AP to the respective stations.

For each of the multiple stations, a weight of the station that is proportional to the respective transmission rate of the station is determined (320). For example, denote $Q_i$ as the weight or quantum of station i. The value of $Q_i$ can be set to be proportional to the transmission rate of station i. As an example, if two stations use a shared wireless channel, station 1 having 10 times the transmission rate of station 2, then the AP can set $Q_1=10$ for station 1 and $Q_2=1$ for station 2. As such, 10 times as many packets can be sent by the AP to station 1 than station 2.

One or more packets are wirelessly transmitted to the station during an airtime allocation to the station (330). In some implementations, the amount of the one or more packets transmitted to the station during the airtime allocation corresponds to the weight of the station and a size of queued packets for the station. For example, for each station i, a deficient counter ($DC_i$) and a queue ($Queue_i$) can be defined. The $DC_i$ can represent the amount of data (e.g., the number of bytes) that the AP is allowed to transmit when it is station i's turn. $Queue_i$ can represent the packets available to be transmitted to the station i. The weight $Q_i$ can represent the number of bytes that is added to the $DC_i$ in each round. In other words, weight $Q_i$ can represent the amount of credit that station i receives per round.

In some implementations, the following operations can be performed by the AP to schedule the downstream transmissions to the multiple stations:

---

For each i where station i that AP has packets to send to
    Add $Q_i$ to $DC_i$
    While $DC_i$ > packet size at head of $Queue_i$
        Transmit packet at head of $Queue_i$
        Deduct packet size from $DC_i$
    End while
End for

---

In other words, for each round and each station, the deficit counter $DC_i$ of station i is updated by adding the weight of the station, $Q_i$, to the deficit counter $DC_i$, i.e., $DC_i=DC_i+Q_i$. The deficient counter $DC_i$ is compared to a size of a next packet to be transmitted to the station i (e.g., at the head of $Queue_i$). If $DC_i$ is larger than or equal to the size of the packet, the AP can transmit the packet to station i. The deficit counter $DC_i$ is then reduced by the size of the transmitted packet. The reduced deficient counter $DC_i$ is compared to a size of a next packet that is now at the head of the $Queue_i$. The AP can keep transmitting packets to station i until the deficit counter $DC_i$ is less than a size of a next packet to be transmitted to the station.

When it is determined that the deficit counter $DC_i$ is less than a size of a next packet to be transmitted to the station, the AP will prevent transmitting the packet to the station i. The AP can switch to determine whether to transmit packets to another station (e.g., station i+1 or i−1) and repeat the above process, for example, until the AP has no data to transmit to any of the stations.

As such, the example allocation determines the number of packets (zero or more) that can be transmitted to each of the stations based on the size of queued packets and the transmission rate for the station (as reflected by the weight added to the deficient counter), which in turn dictates the airtime allocated to each of the stations. Thus, the example allocation can guarantee airtime fairness among the multiple stations without the need to track the time each station has utilized. An example airtime allocation result is shown in FIG. 2, where station 1 and station 2 end up having the equal amount of airtime T within each round of scheduling (i=1 and 2), although station 1 transmits one packet during the allocated airtime T whereas station 2 transmits multiple packets during the allocated airtime T.

In some instances, the airtime allocated to each station is not necessarily a fixed or predetermined value. The allocated airtime can be different among multiple stations within a round. The allocated airtime can change from one station to another on a packet-by-packet basis, but over the long term, the time allocation for each station can be substantially equal.

In some instances, transmission rates of various stations will change over time (e.g., due to channel interference or other factors). Such instances are described with reference to operations 340, 350, and 360, and additional reference to FIG. 4.

FIG. 4 is a block diagram 400 showing another example airtime allocation between two stations when an example DRRAF allocation is implemented in a telecommunications network. As shown in FIG. 4, during the first round, station 1 and station 2 are allocated with respective airtime $T_{11}$ and $T_{21}$; during the second round, the station 1 and station 2 are allocated with respective airtime $T_{21}$ and $T_{12}$. The allocated airtime $T_{11}$, $T_{21}$, $T_{12}$, and $T_{22}$ can be different, depending on the transmission rates and the queued packet sizes of the stations. However, the total airtime allocated to station 1 (e.g., $T_{11}+T_{12}$) and the total airtime allocated to station 2 (e.g., $T_{21}+T_{22}$) are substantially equal (e.g., within a given amount of each other) over a long term, thus ensuring the airtime fairness among the stations.

Referring back to FIG. 3, it is determined that one of the multiple stations has an updated transmission rate (340). In some instances, the transmission rates of one or more stations can change, for example, because the conditions of the wireless channel improve or deteriorate. In some implementations, once a change of the transmission rate for a station is detected (e.g., by the rate detector 116), the AP can take into account such a rate change and re-run the DRRAF allocation to provide real-time or substantially real-time adaptation to the changes. In some implementations, the AP can check if any of the stations has an updated transmission rate regularly or per request, and perform the DRRAF allocation in response to determining that one or more stations have updated transmission rates.

The weight of the station is updated so that the weight is proportional to the updated transmission rate of the station (350). For example, if the transmission rate of the station i changes to $R_i'$, the value of $Q_i$ can be updated to be proportional to $R_i'$. The weights of the other stations may or may not to be changed, for example, depending on whether the weights are normalized across all the stations. For instance, if the weights of all stations are normalized against the weight of the station with the highest transmission rate, the weights of all the stations may need to be recalculated when the highest transmission rate changes. On the other hand, if the highest transmission rate among the stations remains the same, only the weight of the station that has an updated transmission rate needs to be changed. In some implementations, the weight of each station can be normalized to, say, 1 bps or 1 Mbps but not depending on the transmission rate of another station. In this case, the weight for a given station does not need to change unless its rate changes.

One or more packets are wirelessly transmitted to the station during an allocated airtime for the station. The amount of the one or packets transmitted during a given airtime allocation can be based on the updated weight of the station and the size of queued packets for the station (360). The example process described with reference to 330 can be performed based on the updated weight of the station to determine the number of packets to be transmitted to the station.

In some implementations, block transmission (packet aggregation) can be supported. For example, the size of a maximum transmission block can be set as the weight of the station having the maximum transmission rate. The size of the maximum transmission block can be changed when the maximum transmission rate changes among the multiple stations.

Table II shows example test results when the example DRRAF allocation is implemented in a telecommunications network. Test 1 includes three stations with downstream transmission rates of 500, 1000, and 1000 Mbps, respectively. Test 2 includes four stations with downstream transmission rates of 50, 500, 500, and 50 Mbps, respectively. The offered rate represents the input rate of the data traffic that the AP is intended to send to the station. The offered rate can depend on the application that the station is executing (e.g., web browsing, high-definition video downloading, speed test, etc.), and can determine the size of packets in the queue of the station.

Table III shows the results of the same tests but using a round robin scheduler. The throughput results of the tests indicate that the round robin scheduler limits the throughput of the stations by the throughput of the station with the lowest transmission rate. By contrast, the DRRAF allocation provides throughputs proportional to the transmission rates, thus ensuring equal airtime allocated to all the stations and improving the overall throughput of the system.

TABLE II

Test Results with DRRAF

| Test# | Number of Stations | Relative Weights | Transmission Rates(Mbps) | Offered Rates(Mbps) | Throughput (Mbps) |
|---|---|---|---|---|---|
| 1 | 3 | 1 | 500 | 1000 | 175 |
|   |   | 2 | 1000 | 1000 | 350 |
|   |   | 2 | 1000 | 300 | 300 |
| 2 | 4 | 1 | 50 | 1000 | 16.68 |
|   |   | 10 | 500 | 1000 | 166.68 |
|   |   | 10 | 500 | 300 | 166.68 |
|   |   | 1 | 50 | 0 | 0 |

TABLE III

Test Results with Round Robin Scheduler

| Test# | Number of stations | Transmission Rates(Mbps) | Offered Rates(Mbps) | Throughput (Mbps) |
|---|---|---|---|---|
| 1 | 3 | 500 | 1000 | 250 |
|   |   | 1000 | 1000 | 250 |
|   |   | 1000 | 300 | 250 |
| 2 | 4 | 50 | 1000 | 41.6 |
|   |   | 500 | 1000 | 41.6 |
|   |   | 500 | 300 | 41.6 |
|   |   | 50 | 0 | 0 |

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The operations described in this specification can be implemented as operations performed by a data processing device on data stored on one or more computer-readable storage devices or received from other sources.

The term "data processing device" encompasses all kinds of apparatus, devices, and machines for processing data, including by way of example a programmable processor, a computer, a system on a chip, or multiple ones, or combinations, of the foregoing, as well as telecommunications equipment that may include one or more data processing devices. The data processing device can include special purpose logic circuitry, e.g., an FPGA (field programmable gate array) or an ASIC (application-specific integrated circuit). The data processing device can also include, in addition to hardware, code that creates an execution environment for a computer program, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
   determining, by an access point, current respective transmission rates of a plurality of stations configured to wirelessly communicate with the access point;
   determining, by the access point and for each station among the plurality of stations, a weight of the station that is based on and proportional to the current respective transmission rate of the station when the weight is being determined, wherein a first station with a first determined transmission rate has a first weight and a second station with a second determined transmission rate different from the first determined transmission rate has a second weight different from the first weight, and wherein the first weight is proportional to the first determined transmission rate of the first station and the second weight is proportional to the second determined transmission rate of the second station; and transmitting, wirelessly by the access point, a respective specified number of packets to each particular station among the plurality of stations based on the weight that was determined for the particular station, wherein:

the respective specified number of packets are transmitted to the particular station during an airtime allocation that is provided to the particular station; and a total size of the respective specified number of packets transmitted to the particular station is limited by the weight that was determined for the particular station and a size of one or more queued packets that are queued at the access point for delivery to the plurality of stations.

2. The method of claim 1, further comprising:
updating, for each of the plurality of stations, a deficit counter by adding the weight of the station to the deficit counter of the station; and
wherein transmitting, wirelessly by the access point and to each of the plurality of stations, one or more packets to the station comprises:
transmitting, to the station, one or more packets until the deficit counter is less than a size of a next packet to be transmitted to the station.

3. The method of claim 2, further comprising deducting the size of each transmitted packet from the deficit counter.

4. The method of claim 1, further comprising:
updating, for each of the plurality of stations, a deficit counter by adding the weight of the station to the deficit counter of the station; and
wherein transmitting, wirelessly by the access point and to each of the plurality of stations, one or more packets to the station comprises:
determining, during a given transmission interval, that the deficit counter for the station is less than a size of a next packet to be transmitted to the station;
preventing transmission of a packet to the station in response to determining that the deficit counter is less than the size of the next packet; and
transmitting a packet to a different station.

5. The method of claim 1, further comprising:
determining, by the access point, one of the plurality of stations having an updated transmission rate;
updating, by the access point, a weight of the station that is proportional to the updated transmission rate; and
transmitting, wirelessly by the access point, one or more packets to the station during an airtime allocation that is provided to the station, wherein an amount of one or more packets, transmitted to the station during the airtime allocation that is provided to the station, corresponds to the updated weight of the station and a size of queued packets that are queued at the access point for delivery to the station.

6. The method of claim 1, further comprising enabling block transmission by setting a weight of a station having a maximum transmission rate to a size of a maximum transmission block.

7. The method of claim 1, further comprising:
determining a change of a maximum transmission rate among the transmission rates of the plurality of stations; and
recalculating the weights of the plurality of stations based on the change.

8. A device, comprising:
a memory storing instructions executable by one or more data processing devices;
one or more data processing devices that interact with the memory and execute instructions that cause the device to be configured to:
determine current respective transmission rates of a plurality of stations configured to wirelessly communicate with the device;
determine, for each station among the plurality of stations, a weight of the station that is based on and proportional to the current respective transmission rate of the station when the weight is being determined, wherein a first station with a first determined transmission rate has a first weight and a second station with a second determined transmission rate different from the first determined transmission rate has a second weight different from the first weight, and wherein the first weight is proportional to the first determined transmission rate of the first station and the second weight is proportional to the second determined transmission rate of the second station; and
transmit, wirelessly a respective specified number of packets to each particular station among the plurality of stations based on the weight that was determined for the particular station, wherein:
the respective specified number of packets are transmitted to the particular station during an airtime allocation that is provided to the particular station; and
a total size of the respective specified number of packets transmitted to the particular station is limited by the weight that was determined for the particular station and a size of one or more queued packets that are queued at the access point for delivery to the plurality of stations.

9. The device of claim 8, wherein the one or more data processing devices that interact with the memory and execute instructions that cause the device to be configured to:
update, for each of the plurality of stations, a deficit counter by adding the weight of the station to the deficit counter of the station; and
transmit, to each of the plurality of stations, one or more packets until the deficit counter is less than a size of a next packet to be transmitted to the station.

10. The device of claim 9, wherein the one or more data processing devices that interact with the memory and execute instructions that cause the device to be configured to deduct the size of each transmitted packet from the deficit counter.

11. The device of claim 8, wherein the one or more data processing devices that interact with the memory and execute instructions that cause the device to be configured to:
update, for each of the plurality of stations, a deficit counter by adding the weight of the station to the deficit counter of the station; and
wherein transmitting, wirelessly by the device and to each of the plurality of stations, one or more packets to the station comprises:

determine, during a given transmission interval, that the deficit counter for the station is less than a size of a next packet to be transmitted to the station;

prevent transmission of a packet to the station in response to determining that the deficit counter is less than the size of the next packet; and transmit a packet to a different station.

12. The device of claim 8, wherein the one or more data processing devices that interact with the memory and execute instructions that cause the device to be configured to:

determine one of the plurality of stations having an updated transmission rate; update a weight of the station that is proportional to the updated transmission rate; and transmit, wirelessly, one or more packets to the station during an airtime allocation that is provided to the station, wherein an amount of one or more packets, transmitted to the station during the airtime allocation that is provided to the station, corresponds to the updated weight of the station and a size of queued packets that are queued at the access point for delivery to the station.

13. The device of claim 8, wherein the one or more data processing devices that interact with the memory and execute instructions that cause the device to be configured to enable block transmission for a station by setting a weight of a station having a maximum transmission rate to a size of a maximum transmission block.

14. The device of claim 8, wherein the one or more data processing devices that interact with the memory and execute instructions that cause the device to be configured to:

determine a change of a maximum transmission rate among the transmission rates of the plurality of stations; and recalculate the weights of the plurality of stations based on the change.

15. A system, comprising:

an access point;

a plurality of stations configured to wirelessly communicate with the access point; and the access point including one or more data processing devices, the access point configured to:

determine current respective transmission rates of the plurality of stations configured to wirelessly communicate with the access point;

determine, for each station among the plurality of stations, a weight of the station that is based on and proportional to the current respective transmission rate of the station when the weight is being determined, wherein a first station with a first determined transmission rate has a first weight and a second station with a second determined transmission rate different from the first determined transmission rate has a second weight different from the first weight, and wherein the first weight is proportional to the first determined transmission rate of the first station and the second weight is proportional to the second determined transmission rate of the second station;

allocate, to each station among the plurality of stations, a portion of airtime for downstream transmission to each station among the plurality of stations based on the weights of the plurality of stations; and transmit, wirelessly a respective specified number of packets to each particular station among the plurality of stations based on the weight that was determined for the particular station, wherein:

the respective specified number of packets are transmitted to the particular station during an airtime allocation that is provided to the particular station; and a total size of the respective specified number of packets transmitted to the particular station is limited by the weight that was determined for the particular station and a size of one or more queued packets that are queued at the access point for delivery to the plurality of stations.

16. The system of claim 15, wherein the access point is configured to:

update, for each of the plurality of stations, a deficit counter by adding the weight of the station to the deficit counter of the station; and transmit, to each of the plurality of stations, one or more packets until the deficit counter is less than a size of a next packet to be transmitted to the station.

17. The system of claim 16, wherein the access point is configured to deduct the size of each transmitted packet from the deficit counter.

18. The system of claim 15, wherein the access point is configured to:

update, for each of the plurality of stations, a deficit counter by adding the weight of the station to the deficit counter of the station; and wherein transmitting, wirelessly by the access point and to each of the plurality of stations, one or more packets to the station comprises:

determine, during a given transmission interval, that the deficit counter for the station is less than a size of a next packet to be transmitted to the station;

prevent transmission of a packet to the station in response to determining that the deficit counter is less than the size of the next packet; and transmit a packet to a different station.

19. The system of claim 15, wherein the access point is configured to:

determine one of the plurality of stations having an updated transmission rate;

update a weight of the station that is proportional to the updated transmission rate; and transmit, wirelessly, one or more packets to the station during an airtime allocation that is provided to the station, wherein an amount of one or more packets, transmitted to the station during the airtime allocation that is provided to the station, corresponds to the updated weight of the station and a size of queued packets that are queued at the access point for delivery to the station.

20. The system of claim 15, wherein the access point is configured to enable block transmission for a station by setting a weight of a station having a maximum transmission rate to a size of a maximum transmission block.

21. The system of claim 15, wherein the access point is configured to:

determine a change of a maximum transmission rate among the transmission rates of the plurality of stations; and recalculate the weights of the plurality of stations based on the change.

* * * * *